United States Patent [19]
Satoh

[11] 3,961,019
[45] June 1, 1976

[54] METHOD FOR PURIFICATION OF EXHAUST GASES
[76] Inventor: Shinobu Satoh, No. 1-51, Hizumi 1-chome, Kashiwazaki, Niigata, Japan
[22] Filed: Mar. 21, 1974
[21] Appl. No.: 453,192

[30] Foreign Application Priority Data
Mar. 30, 1973 Japan................................. 48-36992

[52] U.S. Cl............................. 423/235; 23/260; 23/284; 423/212; 423/220; 423/242
[51] Int. Cl.²......................................... C01B 21/00
[58] Field of Search ........... 423/235, 212, 242, 220; 23/284, 260

[56] References Cited
UNITED STATES PATENTS

| | | | |
|---|---|---|---|
| 3,005,679 | 10/1961 | Verzley | 423/235 |
| 3,475,133 | 10/1969 | Muller-Wartenberg | 423/242 |
| 3,552,912 | 1/1971 | Bartholomew | 423/235 |
| 3,587,210 | 6/1971 | Shriner | 423/212 |
| 3,745,751 | 7/1973 | Zey et al. | 423/242 |
| 3,773,472 | 11/1973 | Hausberg et al. | 423/242 |
| 3,782,905 | 1/1974 | Huang et al. | 423/242 |

FOREIGN PATENTS OR APPLICATIONS
309,903    2/1970    U.S.S.R.............................. 423/235

Primary Examiner—Oscar R. Vertiz
Assistant Examiner—Eugene T. Wheelock
Attorney, Agent, or Firm—Woodhams, Blanchard and Flynn

[57] ABSTRACT

A method for purification of exhaust gases, which consists of a first purification process comprising making a liquid alkaline chemical react on the exhaust gas thereby to recover nitrogen oxides contained in said exhaust gas as a precipitate together with said liquid chemical and a second purification process comprising passing said exhaust gas which has undergone the first purification process through a glass-fiber mat thereby to convert said glass-fiber mat into an electrode, making the noxious components of the exhaust gas remaining after the first purification process adhere to said electrode and, at the same time, jetting a liquid chemical capable of generating oxygen subject to thermal cracking into the exhaust gas thereby to increase the oxygen content of the exhaust gas, and an apparatus suitable for use in practicing said method.

3 Claims, 2 Drawing Figures

METHOD FOR PURIFICATION OF EXHAUST GASES

BACKGROUND OF THE INVENTION

1. Field of the Invention

The present invention relates to a method and an apparatus for purification of the exhaust gases arising from incineration plants, metal refining factories, oil refineries and others.

2. Description of the Prior Art

The combustion of coal or petroleum is accompanied with the exhaust of noxious substances, and the waste gases or soot and smoke discharged from some chemical plants or metal refining factories also contain noxious substances. When the content of these noxious substances in the air comes to exceed a certain limit, it poses a serious problem from the viewpoint of environmental pollution, factory management and so forth.

As the substances causing the pollution of air, there are (1) noxious gases such as $SO_2$ and $SO_3$ arising from the combustion of sulfur compounds or the combustion of sulfur components of fuels, NO and $NO_2$ originating from the combustion, oxidation, etc. of nitrogen contained in fuels, CO arising from the incomplete combustion of carbon contained in fuels, as well as ammonia, hydrocarbons and the like, (2) the floating soot or dust consisting of fine particles of carbon or ashes arising from the combustion operation, (3) the falling soot or dust consisting of particles less fine than the floating soot or dust, and others.

As means for removing these polluting substances contained in the exhaust gases, in the case where said polluting substance is a noxious gas, (a) a method of purifying said gas by absorbing it with a proper absorbent, (b) a method of absorbing said gas onto the surface of a porous material such as active carbon, silica gel, activated alumina and the like or (c) a method of directly burning and oxidizing said gas thereby to decompose or convert it into a harmless gas or oxidizing it at a relatively low temperature by the use of a proper catalyst is applicable, while in the case where said polluting substance is soot or dust, a method of removing it by the use of a dust-catching apparatus is applied. In performing the dust-catching, the force of gravity, inertia, centrifugal force, cleansing, filtration, electricity, sound wave, etc. are utilized, and, to cite the most popular dust-catching apparatuses, there are Venturi scrubbers, bag filters, electric dust-catchers, centrifugal separators, etc.

The purification of exhaust gases has hitherto been conducted by applying the foregoing methods and apparatuses either individually or by combining them appropriately, but the purification efficiency of such conventional means has not been satisfactory.

SUMMARY OF THE INVENTION

One object of the present invention is to provide a method for purification of exhaust gases, which is capable of further purifying the exhaust gases subsequent to the removal of the greater part of the soot or smoke and the noxious gases contained therein by means of a known apparatus for purification of exhaust gases so as to release them as harmless exhaust gases into the air, coupled with an apparatus suitable for use in practicing said method. Another object of the present invention is to provide a method and an apparatus for purification of exhaust gases, which are capable of increasing the content of oxygen in the purified exhaust gases so as to release them in the form of a desirable exhaust gas into the air.

In other words, the present invention relates to a method for purification of exhaust gases, which is characterized by the application of a first purification process comprising jetting a liquid alkaline chemical into an exhaust gas within one or a plurality of zigzag conduits installed in the middle of a flue thereby to precipitate nitrogen oxides contained in said exhaust gas and removing or recovering the resulting precipitate together with said liquid alkaline chemical, and a second purification process comprising bringing said exhaust gas which has undergone the first purification process into contact with a glass-fiber mat thereby to convert said glass-fiber mat into an electrode, making the noxious components of the exhaust gas remaining after the first purification process adhere or adsorb onto said electrode and, at the same time, jetting a liquid chemical capable of generating oxygen subject to thermal cracking into the exhaust gas thereby not only to accelerate the oxidation of said noxious substances but also to increase the oxygen content of the exhaust gas. In addition, the present invention relates to an apparatus suitable for use in practicing the foregoing method, said apparatus being characterized by the provision of a plurality of jet nozzles for jetting the liquid chemical disposed in the interior of the middle between the top and bottom bends of each of a plurality of zigzag conduits disposed parallel with one another; a discharge conduit for recovering the liquid chemical connected with the bottom bends of the zigzag conduits; a purification shower box equipped with a plurality of glass-fiber mats stretched therein, said box being connected with the ends of each zigzag conduit; a plurality of shower pipes for the purpose of jetting an oxygen-generative liquid chemical, each of said pipes being so disposed as to confront a glass-fiber mat; and an exhaust conduit disposed on the opposite side of said purification shower box.

BRIEF DESCRIPTION OF THE DRAWINGS

In the appended drawings.

In these drawings, 1 denotes a flue, 2 denotes a distributing pipe, 3 denotes the zigzag conduits, 4 denotes the liquid chemical supply conduits, 5 denotes the jet nozzles, 7 denotes the cover plates of the access openings, 8 denotes the liquid chemical recover pipe, 9 denotes a discharge conduit, 10 denotes a liquid chemical storage tank, 11 denotes a sedimentation tank, 15 denotes the glass-fiber mats, 16 denotes the purification/filtration chambers, 17 denotes the shower pipes and 25 denotes the exhaust conduit.

DETAILED DESCRIPTION OF THE INVENTION

The present invention is, as described in brief above, intended for effecting a further purification of the exhaust gases once purified by means of a conventional purifier, in order to release them as harmless exhaust gases into the air.

Figure 1:
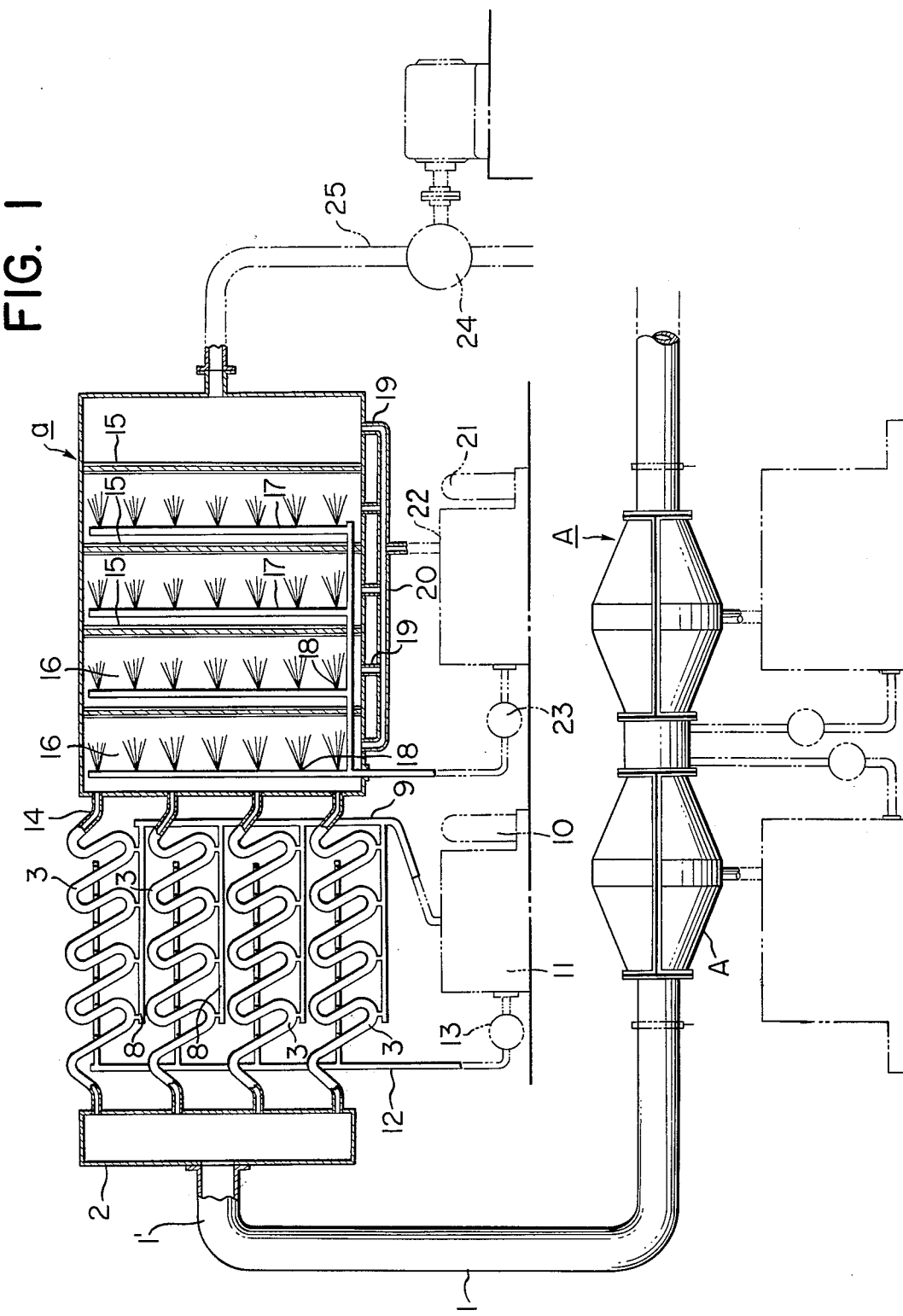
FIG. 1 is a diagrammatic front view, partially cut away, of an apparatus embodying the present invention.

To give full particulars of the present invention with reference to the appended drawings, the exhaust gases discharged from factories and others are first treated with a purifier signified by A in FIG. 1 for the removal of soot or smoke as well as polluting gases. This purifier A does not constitute an essential part of the present invention: it is just an ordinary purifier, and the exhaust gases after passing this purifier A are the subject of treatment in the present invention.

Figure 2:
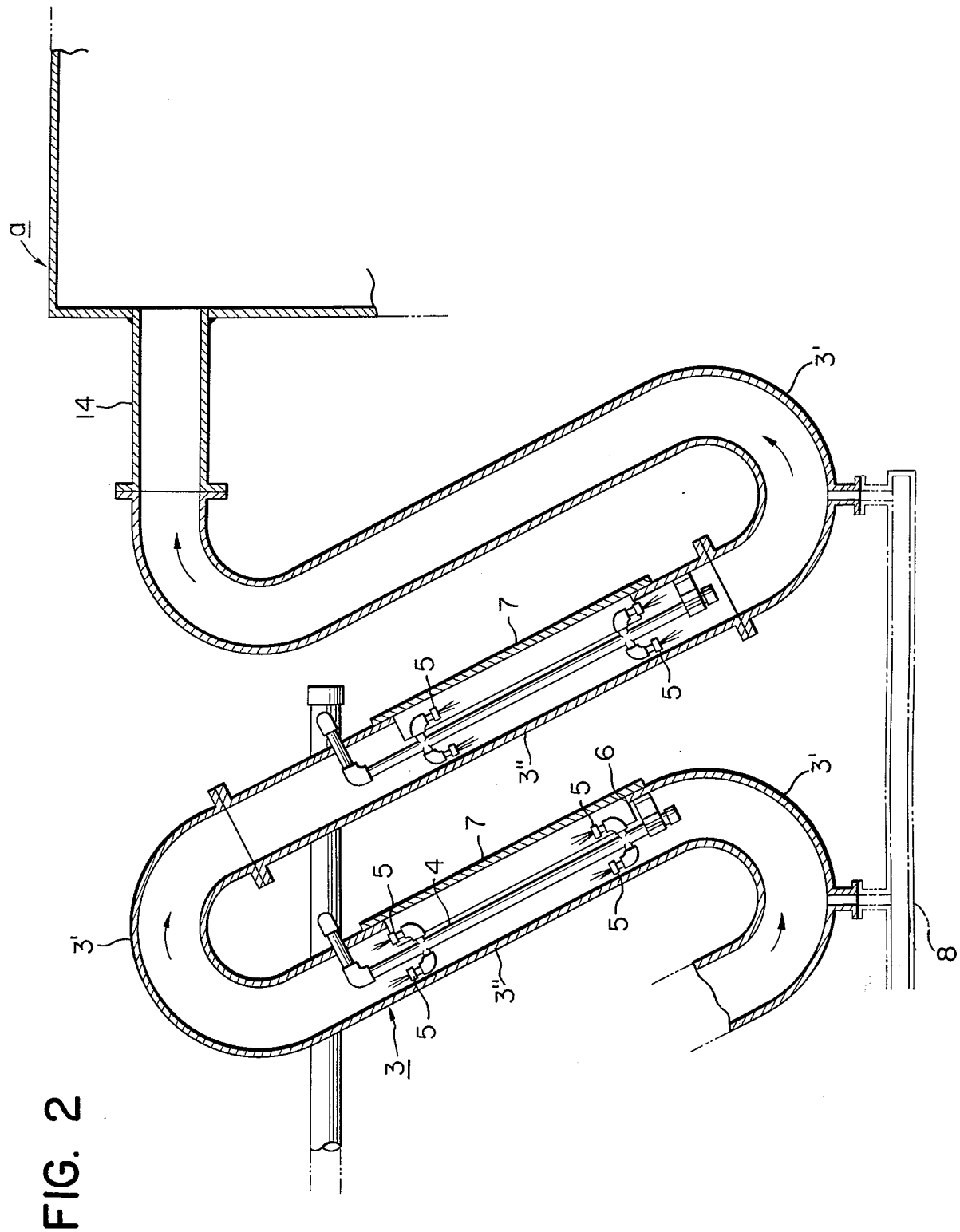
FIG. 2 is a longitudinal sectional view of of a part of the zigzag conduit, on an enlarged scale, of the apparatus shown in FIG. 1.

The distributing pipe 2 is disposed on the side of the exhaust port region 1' of the flue 1 connected to the purifier A. This distributing pipe 2 is provided with a plurality of zigzag conduits 3 which are arranged vertically in a row, and each bottom bend of these zigzag conduits has an opening, which openings are interconnected with one another. FIG. 1 is illustrative of the case wherein 4 zigzag conduits 3 are installed in parallel. In the middle part 3'' between the top and the bottom bends 3' of each zigzag conduit 3 a liquid chemical supply conduit 4 is inserted lengthwise. A plurality of jet nozzles 5 which are directed in the direction of the flow of exhaust gas are equipped on the upper and the lower parts of the liquid chemical supply conduit 4. FIG. 2 is illustrative of the case wherein a pair of jet nozzles 5 are equipped on both the upper and the lower parts of the liquid chemical supply conduit 4. In the middle part 3'' of the section of said zigzag conduit corresponding to the location of the jet nozzles 5, there is formed the opening 6 for cleaning, said opening for cleaning being provided with the cover 7. All bottom bends 3' of each zigzag conduit 3 are connected with a recovering pipe 8 for recovering the liquid chemical flowed into said conduits, and all recovering pipes 8 are connected with a single discharge conduit 9, said discharge conduit 9 being further connected to the sedimentation tank 11 provided with the liquid chemical storage tank 10. This sedimentation tank 11 is connected with the liquid chemical feed pipe 12 for supplying the liquid chemical to the liquid chemical supply conduit 4, and the pump 13 is installed in the middle of said liquid chemical feed pipe 12.

In the meantime, the terminal portions 14 of the zigzag conduits 3, that is, the outlets for the exhaust gas, are is connected with the purification shower box (a) consisting of a purification/filtration chamber 16 employing one glass-fiber mat 15, preferably a plurality of purification/filtration chambers 16 partitioned with plural glass-fiber mats 15. The shower pipes 17 for jetting the liquid chemical is so disposed as to confront the glass-fiber mat 15, and said shower pipes 17 are provided with a plurality of shower nozzles 18. The bottom of each purification/filtration chamber 16 is provided with the exhaust port 19, said exhaust port 19 being connected with the exhaust conduit 20. And, said exhaust conduit 20 is connected with the sedimentation tank 22 provided with the liquid chemical storage tank 21. The sedimentation tank 22 and the shower pipes 17 are interconnected through the pump 23. The outlet side of the purification shower box (a) is connected with the exhaust conduit 25 equipped with the pump 24.

The apparatus according to the present invention has such a structure as described in the foregoing. Hereunder will be given a further elucidation of the present apparatus from the view point of the function thereof.

To begin with, the exhaust gas after removing soot or smoke and polluting gases contained therein by the purifier A is introduced into each zigzag conduit 3 through the distributing pipe 2. Within the zigzag conduit 3, a liquid alkaline chemical is blown against the exhaust gas through the jet nozzle 5, so that there is imparted to the particles sufficient energy to effect ionization of particles by virtue of the heat energy of the exhaust gas and the jet pressure of the liquid chemical, leading to the crystallization of nitrogen oxides contained in the exhaust gas, such as lead compound, NOx etc., on the ions. On this occasion, as the liquid alkaline chemical is jetted in the direction of the flow of said exhaust gas, the difference in frictional resistance is enhanced, giving rise to a gas-hammer effect. Such a phenomenum not only further ensures the crystallization of nitrogen oxides contained in the exhaust gas but also effects smooth passage of the exhaust gas through the zigzag conduit 3. Moreover, by virtue of the jetting of said liquid alkaline chemical, the adhesion of crystals on the inside of the zigzag conduit 3 can be prevented, or, if any crystals adhere thereto, they may be washed off. These crystals are discharged together with the liquid alkaline chemical to the outside through the discharge conduit 9 connected with the bottom bend 3' of the zigzag conduit 3 and are removed by a suitable means. In FIG. 1, as the means for removing said crystals, the sedimentation tank 11 is employed, and it is so devised as to utilize the liquid alkaline chemical by circulating it. The liquid alkaline chemical to be jetted from the jet nozzle 5 within the zigzag conduit 3 is an alkaline aqueous solution having a pH value of 7.5–12, preferably 7.5–10. In the case where the pH value is less than 7.5, nitrogen oxides contained in the exhaust gas can not be effectively crystallized, while in the case where the pH value is too small and the liquid has a strong acidity or weak acidity, it may cause the corrosion of apparatus so that it is undesirable. On the contrary, when the pH value exceeds 12, there is possibility of damaging the machine. As the alkali agent for use in the liquid alkaline chemical according to the present invention, caustic soda, sodium nitrite, potassium nitrite, potassium hydroxide, etc. can be cited, and these compounds are employed either individually or upon mixing two or more of them. To give an example of desirable liquid alkaline chemical, there is a mixture solution of caustic soda and sodium nitrite (with the mixing ratio of NaOH to $NaNO_2$ by weight being in the range of 100:0.3 – 100:0.7) or a mixture solution of caustic soda and potassium nitrite.

The exhaust gas having undergone the first purification process within the zigzag conduit 3 is introduced into the purification shower box (a) provided with the glass-fiber mat 15 as stretched therein. When this exhaust gas comes in contact with the glass-fiber mat 15, there occurs ionization of molecules automatically by virtue of the energy of the exhaust gas, whereby the glass-fiber mat 15 becomes electrically charged so as to function in the nature of an electrode. The noxious components of the exhaust gas remaining after the first purification process adhere or are adsorbed onto said electrode. By virtue of the provision of a plurality of glass-fiber mats 15, the noxious substances that failed to adhere or be absorbed onto the first electrode come to adhere or be adsorbed onto the succeeding electrodes in the course of passing a series of purification/filtration chambers 16 one after another, whereby purification work can be reliably performed. The glass-fiber mat 15 to be employed herein is prepared by cutting a glass fiber of about 1–20$\mu$ in diameter into 3–50mm long pieces, piling up said pieces by scattering them to intercross at random and forming the resulting pile of pieces into a mat by applying a binder. Simultaneously with the foregoing adhesion or adsorption of the noxious substances onto the electrode, an oxygen-generative liquid chemical is jetted against the glass-fiber mat 15. When the applied liquid chemical is, for instance, an aqueous solution of potassium chloride-sodium nitrate mixture, said liquid chemical gives rise to potassium nitrate by virtue of the high temperature of the exhaust gas, and oxygen is generated by virtue of the ionization energy arising spontaneously from heat energy. As a result, the oxygen content of the purified exhaust gas increases, leading to acceleration of the oxidation reaction. As the applicable oxygen-generative liquid chemical to be jetted from the shower nozzle 18, potassium chloride, sodium nitrate etc. can be cited, and it is preferable to apply a potassium chloride-sodium nitrate mixture solution (with the mixing ratio of KCl to $NaNO_3$ by weight being in the range of 100:50 – 100:70). In the case where a considerable amount of noxious substances have adhered or been adsorbed onto the glass-fiber mat 15, said mat may be either replaced or cleaned. In this connection, the liquid chemical blown in through the shower nozzle 18 and the resulting crystals are discharged to the outside through the exhaust conduit 20 connected with the bottom of the purification/filtration chamber 16. In the apparatus shown in FIG. 1, these things are received in the sedimentation tank 22, and the liquid chemical is circulated for reuse.

The exhaust gas having undergone the second purification process within the purification shower box (a) is discharged to the outside through the exhaust conduit 25. In this case, a part of the exhaust gas may be sent in the combustion chamber as occasion demands.

As will be understood from the above description, the present invention is intended to perform the purification of exhaust gases through a multi-stage purification process comprising passing an exhaust gas, which has been purified with a purifier, through the zigzag conduit and the purification shower box. Accordingly, the purification work can be sufficiently performed, and a harmless gas is exclusively discharged to the outside automatically. Besides, the present invention has a merit that it requires no after-treatment and makes it possible to perform the purification work continuously.

DESCRIPTION OF THE PREFERRED EMBODIMENTS

EXAMPLE 1

An exhaust gas discharged from a garbage disposal factory was introduced in the purifier A, whereby the greater part of the soot or smoke and the polluting gases contained in said exhaust gas were separated and removed. Subsequently the thus treated exhaust gas G was introduced into the zigzag conduit 3 through the flue 1. In this connection, the exhaust gas G was composed of 18,000 ppm of $NO_x$, 5,000 ppm of CO, 28 ppm of $SO_2$, 1,000 ppm of $CO_2$ and 10,000 ppm of $O_2$, the temperature of said exhaust gas was 800°C and the flux thereof within the flue 1 was 28 $m^3$/sec.

The number of zigzag conduits 3 was four. The liquid chemical jetted from the jet nozzle 5 was an alkaline aqueous solution consisting of 30 wt.% of NaOH and 2.5 wt.% of $Na_2NO_2$ against 100 wt.% of $H_2O$. This liquid chemical was released at the rate of 125 kg/min per one liquid chemical supply conduit 4. As a result of this first purification process, the composition and temperature of the exhaust gas $G_1$ passing the terminal portion 14 of the zigzag conduit were as shown in Table-1 below.

The exhaust gas ($G_1$) having undergone the foregoing first purification process was introduced into the purification shower box (a). The number of both the glass-fiber mat 15 and the shower pipe 17 employed for the purification shower box (a) was 20. The liquid chemical jetted from the shower nozzle 18 was an alkaline aqueous solution consisting of 30 wt.% of KCl and 10 wt.% of $NaNO_3$ against 100 wt.% of $H_2O$. This liquid chemical was released at the rate of 40 kg/min per one shower pipe 17. As a result of this second purification process, the composition and temperature of the exhaust gas ($G_2$) passing the exhaust conduit 25 were as shown in Table-1 below.

Table 1

|  | sample exhaust gas (G) | exhaust gas ($G_1$) undergone 1st purification process | exhaust gas($G_2$) undergone 2nd purification process |
|---|---|---|---|
| (composition, ppm) |  |  |  |
| NOx | 18,000 | 50 | 30 |
| CO | 5,000 | 60 | 25 |
| $SO_2$ | 28 | 5 | 2 |
| $CO_2$ | 1,000 | 20 | 12 |
| $O_2$ | 10,000 | 4,800 | 34,000 |
| temperature (°C) | 800 | 380 | 60 |

EXAMPLE 2

The purification work was performed in the same way as in Example 1 except for substituting an alkaline aqueous solution consisting of $NaNO_2$, NaOH and $Na_2HPO_4$ for the alkaline aqueous solution employed as the liquid chemical jetting from the jet nozzle 5 in Example 1. The result was as shown in Table-2 below.

Table 2

|  | exhaust gas ($G_1$) undergone 1st purification process | exhaust gas ($G_2$) undergone 2nd purification process |
|---|---|---|
| (composition, ppm) |  |  |
| NOx | 30 | 10 |
| CO | 32 | 8 |
| $SO_2$ | 3 | 2 |
| $CO_2$ | 15 | 8 |
| $O_2$ | 3,000 | 35,000 |

(Remark)
The sample exhaust gas (G) used herein is identical with that in Example 1.

What is claimed is:

1. A method for the purification of hot exhaust gas which contains as impurities $NO_x$, $SO_2$, $CO_2$ and CO from a combustion operation, which comprises the steps of: in a first purification stage, flowing the exhaust gas in an overall horizontal direction through one or a plurality of sinuous conduits arranged in a substantially vertical plane with the conduit or conduits having upper reversely curved bends connected by intermediate upright sections to lower reversely curved bends, injecting an aqueous solution of alkaline material having a pH of 7.5-12 into the flowing exhaust gas stream at a plurality of locations inside the upright sections of said conduit with said aqueous alkaline solution being directed longitudinally in the conduit in the same direction as the direction of flow of the exhaust gas so as to precipitate the reaction products of said alkaline material with said impurities in said exhaust gas, and removing said aqueous alkaline solution and precipitates contained therein from the lower bends of the conduit or conduits; and then, in a second purification stage, flowing the exhaust gas that exits from the first purification stage horizontally through a zone containing a plurality of upright, horizontally spaced-apart, glass fiber mats so that the exhaust gas passes in series through the glass fiber mats, and simultaneously injecting into the zone, at locations between the glass fiber mats, streams of an aqueous solution of oxygen-generating material effective to generate oxygen by thermal decomposition in said zone by contact with said hot exhaust gas, said streams of said aqueous solution of oxygen-generating material being injected horizontally toward the mats and in the same direction as the direction of flow of the exhaust gas whereby an additional quantity of the remaining impurities in said exhaust gas adhere to or are adsorbed by the glass fiber mats and oxygen is generated in the exhaust gas, and removing from the bottom of said zone the spent aqueous solution of oxygen-generating material; and then discharging the exhaust gas leaving said zone.

2. A method according to claim 1, in which the alkaline material consists of a member selected from the group consisting of a mixture of caustic soda and sodium nitrite and a mixture of caustic soda and potassium nitrite.

3. A method according to claim 1, in which said oxygen-generative liquid chemical for use in the second purification stage is a solution of a mixture of potassium chloride and sodium nitrate.

* * * * *